United States Patent Office 3,355,493
Patented Nov. 28, 1967

3,355,493
PROCESS FOR PYROLYSIS OF 2,2-DICHLORO-PERFLUOROCYCLOALKANONES
Louis G. Anello, Basking Ridge, and Richard F. Sweeney, Randolph Township, Dover, N.J., assignors to Allied Chemical Corporation, New York, N.Y., a corporation of New York
No Drawing. Filed Jan. 25, 1965, Ser. No. 427,936
6 Claims. (Cl. 260—586)

This invention relates to a process for preparing 2-chloroperfluorocycloalkene-1-ones of the formula

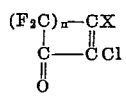

wherein X is a member selected from the group consisting of chlorine and fluorine, and $n$ is an integer from 2 to 3.

All the compounds of the above formula are known with the exception of 2-chloropentafluoro-2-cyclopentene-1-one, which is a new composition of matter. The chloropolyfluorocyclohexene-1-ones have been prepared in the past by the action of $SO_3$ on 1,2-dihalooctafluoro-1-cyclohexene in the presence of a catalyst as described in copending application of Richard F. Sweeney, Louis G. Anello, Melvin M. Schlechter, and Benjamin Veldhuis, Serial No. 373,058, filed June 5, 1964. The dichloropolyfluorocyclopentene-1-one has also been prepared by the action of $SO_3$ on 1,2-dichlorohexafluoro-1-pentene as described in copending application of Robert J. DuBois and Benjamin Veldhuis, Serial No. 373,110, filed June 5, 1964, now Patent No. 3,310,554. The above compounds including the new 2-chloropentafluoro-2-cyclopentene-1-one are useful as intermediates in the preparation of arylamino halogen-substituted cyclic ketones useful as intermediates in the preparation of amines which have utility as pesticidal compositions. The new 2-chloroperfluoro-2-cycloalkene-1-one is additionally useful as an intermediate in the production of the 2,3-dichlorohexafluoro-2-cycloalkene-1-one of the character described in copending application of Everett E. Gilbert and Benjamin Veldhuis, Serial No. 373,056 filed June 5, 1964.

We have now found that the above compounds can be prepared by the pyrolysis of the appropriate 2,2-dichloroperfluorocycloalkane-1-one in the vapor phase at temperatures between about 250° C. and about 500° C. according to the equation

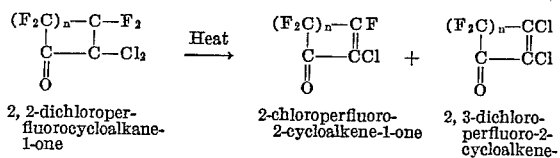

| 2, 2-dichloroperfluorocycloalkane-1-one | 2-chloroperfluoro-2-cycloalkene-1-one | 2, 3-dichloroperfluoro-2-cycloalkene-1-one | wherein $n$ may be 2 or 3.

The two starting materials represented by the formula on the left of the above equation, namely 2,2-dichlorohexafluorocyclopentane-1-one and 2,2-dichlorooctafluorocyclohexane-1-one may be prepared by chlorinating a 1-chloro-2-alkoxy-perfluorocycloalkene of 5 or 6 carbon atoms respectively in the presence of actinic radiation as described in our copending application Serial No. 381,229, filed July 8, 1964, now abandoned.

The mechanism of the reaction is not completely understood but is believed to be a homogeneous gas phase reaction proceeding by a free radical mechanism.

In carrying out the thermal dehalogenation of our invention, 2,2-dichlorooctafluorocyclohexanone or 2,2-dichlorohexafluorocyclopentanone is vaporized and the vapor is passed through a reactor heated to between about 250° C. and about 500° C., preferably to between about 350° C. and about 450° C. The reaction product is condensed and fractionally distilled to isolate the products 2-chloroheptafluoro-2-cyclohexene-1-one, B.P. 101° C. and 2,3-dichlorooctafluoro-2-cyclohexene-1-one, B.P. 135° C., when the starting material is 2,2-dichlorooctafluorocyclohexanone, i.e., $n$ is 3, and the products 2-chloropentafluoro-2-cyclopentene-1-one, B.P. 89–91° C. and 2,3-dichlorohexafluoro-2-cyclopentene-1-one, B.P. 127° C., when the starting material is 2,2-dichlorohexafluorocyclopentane-1-one, i.e., where $n$ is 2. The reactions are shown below:

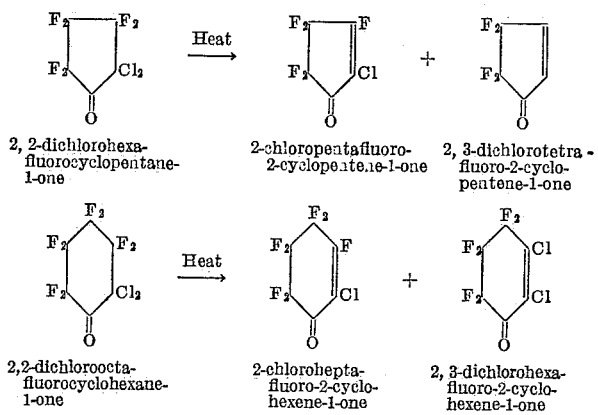

| 2, 2-dichlorohexafluorocyclopentane-1-one | 2-chloropentafluoro-2-cyclopentene-1-one | 2, 3-dichlorotetrafluoro-2-cyclopentene-1-one |

| 2,2-dichlorooctafluorocyclohexane-1-one | 2-chloroheptafluoro-2-cyclohexene-1-one | 2, 3-dichlorohexafluoro-2-cyclohexene-1-one |

The pyrolysis is preferably carried out in a tubular reactor which may be empty or may be packed, as with, for example, nickel mesh, glass helices, Alundum chips, chromic oxide pellets, or chromium trifluoride pellets. Although the reaction will proceed in an unpacked tube, packing facilitates heat transfer and promotes turbulent flow. The reactor may be constructed of any suitable inert structural material suitably nickel, Monel metal, Alundum, or steel. Nickel and Monel are preferred. The reaction takes place rapidly, suitable residence times being between about 10 seconds and about 5 minutes, usually between about one minute and about two minutes. The pyrolysis is preferably carried out at atmospheric pressure, but sub or superatmospheric pressures can be employed if desired so long as the reactants are maintained in the vapor state. The resulting pyrolytic products are condensed by cooling and are then recovered and separated by fractional distillation.

The following specific examples further illustrate the invention. Parts are by weight except as otherwise noted.

Example 1

A ⅝" I.D. x 36" long Alundum reactor packed with glass helices was maintained at 375° C., being heated over a thirty-inch length by an electric furnace. During a period of 2¾ hours, 55 grams (0.18 mole) of 2,2-dichlorooctafluorocyclohexanone vapors were passed through the reactor. Exit products were passed into Dry-Ice-acetone and liquid nitrogen-cooled traps from which reaction products were isolated by fractional distillation. The liquid nitrogen trap contained 28 grams of material which was identified by infrared to be almost pure $SiF_4$ contaminated with traces of CO and $CF_2Cl_2$. The Dry-Ice-acetone trap contained 52 grams organic material. Fractional distillation of the organic material recovered gave 1.0 gram forecut; 7 grams (0.03 mole) 2-chloroheptafluoro-2-cyclohexene-1-one (B.P. 101° C.); 10 grams (0.032 mole) 2,2-dichlorooctafluorocyclohexanone (B.P. 116° C.); and 28 grams (0.10 mole) 2,3-dichlorohexafluoro-2-cyclohexene-1-one (B.P. 135° C.). Based on starting material recovered, there was obtained a 13% conversion and a 16% yield of 2-chloroheptafluoro-2-cyclohexene-1-one and a 56% conversion and a 70% yield of 2,3-dichlorohexafluoro-2-cyclohexene-1-one.

Example 2

A ½" I.D. x 36" long nickel reactor packed with Cr₂O₃ pellets was maintained at 300° C.

During a period of 2½ hours, 66 grams (0.21 mole) of 2,2-dichlorooctafluorocyclohexanone and 15 grams (0.75 mole) HF were passed through the reactor. The exit products were passed over NaF pellets heated from 100° to 175° C., to remove acid gases, and thence to a Dry-Ice-acetone trap. Fractional distillation of the 60 grams product recovered gave 6 grams (0.02 mole) 2-chloroheptafluoro-2-cyclohexene-1-one, 45 grams (0.15 mole) 2,2-dichlorooctafluorocyclohexanone, and 8 grams (0.03 mole) 2,3-dichlorohexafluoro-2-cyclohexene-1-one. Based on starting material recovered, there was obtained an 11% conversion and a 38% yield of 2-chloroheptafluoro-2-cyclohexene-1-one and a 14% conversion and a 48% yield of 2,3-dichlorohexafluoro-2-cyclohexene-1-one.

Example 3

Using the apparatus described in Example 1, 52 grams (0.20 mole) of 2,2-dichlorohexafluorocyclopentanone vapors are passed through the reactor during a period of about 3 hours, while the temperature of the packing is maintained at about 375° C. Exit products are passed into Dry-Ice-acetone and liquid nitrogen-cooled traps from which reaction products are isolated by fractional distillation. The Dry-Ice-acetone trap contains about 45 grams of organic material. Fractional distillation of the organic material recovered gives about 5.0 grams (0.02 mole) 2-chloropentafluoro-2-cyclopentene-1-one (B.P. 89–91° C.); 8.0 grams (0.31 mole) 2,2-dichlorohexafluorocyclopentanone (starting material) (B.P. 85–88° C.); and 26 grams (0.12 mole) 2,3-dichlorohexafluoro-2-cyclopentene-1-one (B.P. 127° C.).

While the above describes the preferred embodiments of our invention, it will be understood that departures can be made therefrom within the scope of the specification and claims.

We claim:

1. The process for preparing a mixture of chlorofluoro-cycloalkene-1-ones of the formulas

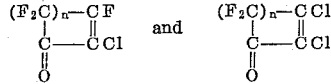

wherein $n$ is an integer of 2 or 3, which comprises heating a 2,2-dichloroperfluoroalkane-1-one of the formula

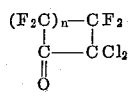

wherein $n$ is as defined above, in the vapor phase at temperatures between about 250° C. and about 500° C. for periods of at least about 10 seconds.

2. The process according to claim 1 wherein the temperature is between about 350° C. and about 450° C.

3. The process according to claim 1 wherein the temperature is maintained for a period of between about one minute and about two minutes.

4. The process according to claim 1 wherein the reaction products are cooled to condense them and are then fractionally distilled to separately recover the 2-chloroperfluoro-2-cycloalkene-1-one and 2,3-dichloroperfluoro-2-cycloalkene-1-one.

5. The process for preparing a mixture of chlorofluoro-cyclopentene-1-ones of the formulas

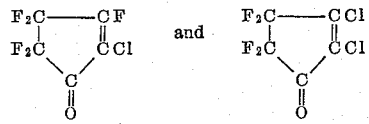

which comprises heating 2,2-dichlorohexafluorocyclopentane-1-one in the vapor phase at temperatures between about 250° C. and about 500° C. for periods of at least about 10 seconds.

6. The process for preparing a mixture of chlorofluoro-2-cyclohexene-1-ones of the formulas

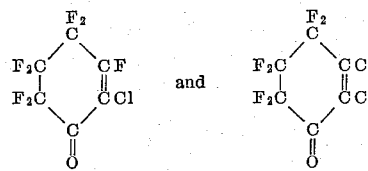

which comprises heating 2,2-dichlorooctafluorocyclohexane-1-one in the vapor phase at temperatures between about 250° C. and about 500° C. for periods of at least about 10 seconds.

References Cited

UNITED STATES PATENTS 3,192,274  6/1965  Baranauckas et al. __ 260—653.5

OTHER REFERENCES

McBee et al.: J. Am. Chem. Soc., vol. 84, pp. 3557–61 (1962).

Raphael et al.: Adv. in Org. Chem., p. 263 (1963).

LEON ZITVER, *Primary Examiner.*

M. JACOB, *Assistant Examiner.*